Jan. 21, 1930.  F. J. BENSON  1,744,438
MOLDING INNER TUBES
Filed Jan. 25, 1928

INVENTOR.
Fred J. Benson
BY Robert M. Harvey
ATTORNEY.

Patented Jan. 21, 1930

1,744,438

UNITED STATES PATENT OFFICE

FRED J. BENSON, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS

MOLDING INNER TUBES

Application filed January 25, 1928. Serial No. 249,430.

This invention relates to the manufacture of rubber articles and is herein illustrated in its application to the curing or vulcanizing of inner tubes. It will be recognized, however, that in many respects the invention is not limited to the manufacture of articles of this particular type, but is generally applicable to the manufacture of rubber articles of various classes.

It has heretofore been difficult from the practical standpoint to vulcanize inner tubes in complete molds when using transfers for imprinting the size and brand on the outside surface of the tubes. The transfers have been laid either in the mold cavity before the tubes were placed in the mold or the transfers have been pushed in between the mold and tube after the tubes were positioned in one of the mold sections. The difficulty has been that the transfer corners became bent or folded or the transfers became wrinkled.

A general object of my invention is to provide a method of molding inner tubes which will eliminate the above-mentioned deficiencies.

A further object of my invention is to provide a novel method whereby the imprinting transfers can be temporarily held in place against the mold surface while the raw or uncured tubes are being placed in the mold.

My invention calls for but a slight departure from the usual practice in molding tubes, but it removes a serious defect found in the former practice. My invention will be described with reference to the accompanying drawings in which Fig. 1 is a front elevation of a vertical tube mold shown in the loading position, part of the mold being broken away;

Figure 1:
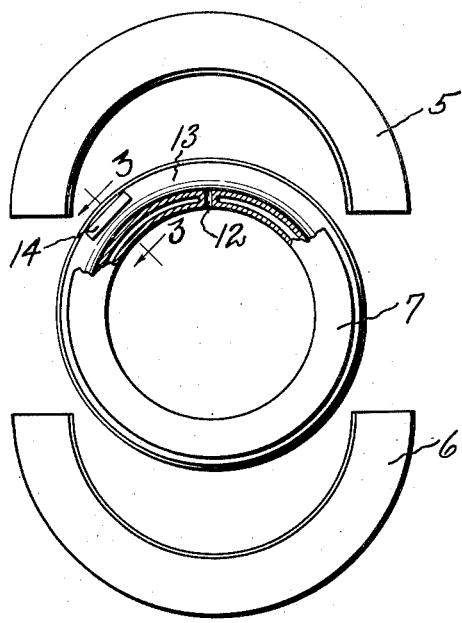

Referring to Fig. 1, which illustrates a convenient type of steam heated mold wherein the inner tubes may be molded, the mold is formed with outer sections 5 and 6 and an inner mold section 7 which are provided with cavities coinciding with one another when the mold is closed to form an annular molding cavity.

Figure 2:
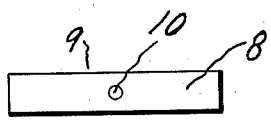
Fig. 2 is a detail showing the back of a tube transfer.

In Fig. 2 I have shown on the non-imprinting side 8 of the paper transfer 9 a small dab of rubber cement 10. The transfer may be used equally as well when the entire back 8 has been coated with rubber cement. Although there are different kinds of and grades of transfers, they are all fundamentally alike. Many tube manufacturers have adopted the use of paper transfers as they are much cheaper and give satisfactory results so far as the transferring qualities are concerned.

The exact location of the transfers in the mold is not important, but I prefer to place the transfer 9 in the mold section 7 near the valve stem opening 12. The transfer is positioned and located in the mold by applying and holding the non-imprinting side 8 of the transfer against the mold surface with a slight pressure applied to the cement coated portion of the transfer. The cement 10 acts as a temporary means of holding the transfer in place in the mold.

There are several different methods of forming and placing unvulcanized inner tubes in the tube molds. Two of the methods I will describe for purposes of illustration of my invention. It is to be understood that the invention comprehends changes, variations and modifications which come within the scope of the claims hereunto appended. One method of molding inner tubes consists in inflating and placing a tube in the inner mold section 7 after positioning and locating the tube imprinting transfer on the mold surface 13. The mold sections 5 and 6 are then moved up against the inner mold section 7 to form an annular molding cavity in which the tube is shaped and molded. On closing the mold the tube is immediately expanded and held against the surface of the mold and imprinting surface 14 of the transfer by increasing the air pressure in the tube.

Figure 4:
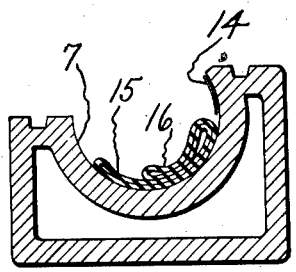
Fig. 4 is a section of a tube mold illustrating one method of placing uncured inner tubes in a mold section.
Figure 3:
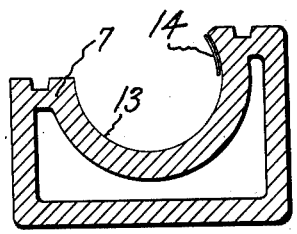
Fig. 3 is a section on line 3—3 of Fig. 1, taken on a larger scale than Fig. 1.

In Figure 4 I have shown a second method of placing an uncured tube in a tube mold which consists in folding the tube 15 over on itself laterally and positioning the folded tube in the inner mold section 7. Before the longitudinally folded tube is placed in the mold the tube transfer is attached to the mold surface 13. Immediately after the tube is positioned in the mold air is admitted to the tube 15. The outer mold sections 5 and 6 are simultaneously, with the introduction of the air, closed about the inner section 7 to form the annular tube molding cavity. The inner tube 15 is partially inflated when the mold sections are almost closed and as the inflation continues the fold 16 straightens out until the tube is expanded and held against the interior of the mold and the imprinting surface 14 of the transfer.

It is possible to maintain a uniform gauge throughout the tube sections where tube transfers are provided with an adhesive and stuck to the mold before the tubes are placed in the mold. This permits greater rapidity in assembly of the tube and mold and the introduction of air pressure within the tube. Since the tube molds are generally warm, and where individual steam heated vulcanizers are used, the molds are kept hot continually, whether tubes are in them or not. When a tube is placed in a hot mold it is immediately subjected to heat. Previous to the use of my invention portions of the tube in contact with the mold became heated while the transfer was being positioned between the tube and mold, resulting in thinning of the tube stock when the tube was expanded and shaped to the interior of the mold. Thinning or unevenness of gauge of the tube is due to the hot parts of the rubber stretching more easily than the cold parts.

The transfers do not adhere to the mold surface as much as they do to the tacky rubber stock. This allows the transfers to be stripped or removed from the mold with the inner tube. Upon stripping the transfers from the tubes it will be found that the ink or bronze has left the transfer and has been transferred to the inner tube.

I do not wish to be restricted to the form of my invention as shown in the accompanying drawings and described in the specification except as defined in the appended claims.

Having thus described my invention, I claim:

1. The method of molding rubber articles which consists in temporarily attaching an imprinting transfer to the surface of a mold, placing a rubber article in the mold, closing the mold, and vulcanizing the rubber article.

2. The method of molding rubber articles which consists in coating the back of an imprinting transfer with a plastic material, pressing the coated side of the transfer against a heated mold surface, placing a hollow rubber article in the mold, inflating the rubber article, closing the mold, and vulcanizing the hollow rubber article.

3. The method of molding inflatable rubber articles which consists in applying a rubber cement to the back of an imprinting transfer, pressing the back of the transfer against a heated mold surface, placing an inflatable rubber article in the mold, closing the mold, inflating the article to expand it against the mold, and vulcanizing the hollow rubber article.

4. The method of molding inner tubes which consists in temporarily attaching an imprinting transfer to the surface of a heated mold, placing the inner tube in the heated mold, partially inflating the tube as the mold closes, and completing inflation of the tube after the mold has been closed.

FRED J. BENSON.